INVENTORS
ROBERT J. KLEIN
CHRIST P. BOZOS

Paul O. Pippel
ATTORNEY

3,202,177
PRESSURE REGULATING VALVE
Robert J. Klein, Elmhurst, and Christ P. Bozos, Hinsdale, Ill., assignors to International Harvester Company, Chicago, Ill., a corporation of New Jersey
Filed Nov. 20, 1961, Ser. No. 153,278
4 Claims. (Cl. 137—514.7)

This invention relates to a pressure regulating valve and in particular to a valve of that type which is readily mounted in various locations in a fluid system for reducing excess pressure to maintain a predetermined pressure in the system.

It is therefore a general object of this invention to provide a compact easily mountable pressure regulating valve.

Another object of this invention is to provide a pressure regulating valve so constructed as to be easily mountable in a fluid pressure system without requiring locking members for securing it within the fluid pressure system.

Still another object of this invention is to provide a pressure regulating valve that can be easily mountable anywhere upon the wall of a pressurized system or vessel through the simple expediency of boring an aperture in such wall and then fitting the valve snugly within the aperture. More particularly, our invention provides a capsule valve comprising an external element having a hollow first portion deflectingly wedged in the aperture and a free end portion extending in an outer direction from the vessel; first means projecting from the outside of the hollow portion at the inner end of the valve for engagement with one side of the wall; a valve piston of substantially uniform diameter arranged with the outer wall of the piston in engagement with the inner wall of the external element; a passage in the piston and an end portion in the piston which is connected to the passage and covered by the engaging wall of the external element, the port being in communication through the passage with the aperture in the vessel; the wall of the external element being relatively relieved at the inner end of the valve; second means projecting from the outside of the piston adjacent the end port to engage the external element for limiting piston travel; biasing means in the relieved portion of the wall of the external element; and removable means projecting from the end of the piston at the inner end of the valve and connecting the biasing means to bias the piston into a valve open piston. As herein illustrated, the first and second means and also the removable means comprise snap rings which fit in grooves on opposite ends of the piston and on the external element at the inner end of the valve. The snap ring which constitutes the removable means coacts with the relieved portion to form a dashpot for dampening the valve.

A still further object of this invention is to provide a valve assembly that can easily be bench checked for the pressure regulating characteristics prior to assembly on end product, and one that eliminates valve chatter.

Other objects and advantages of this invention will become apparent from the following description taken in connection with the accompanying drawings. It will be understood that changes may be made in the details of construction and arrangement of parts shown and described without departing from the spirit of the invention, as set forth in the accompanying claims, as the preferred form on the invention has been given by way of illustration only.

Figure 1:
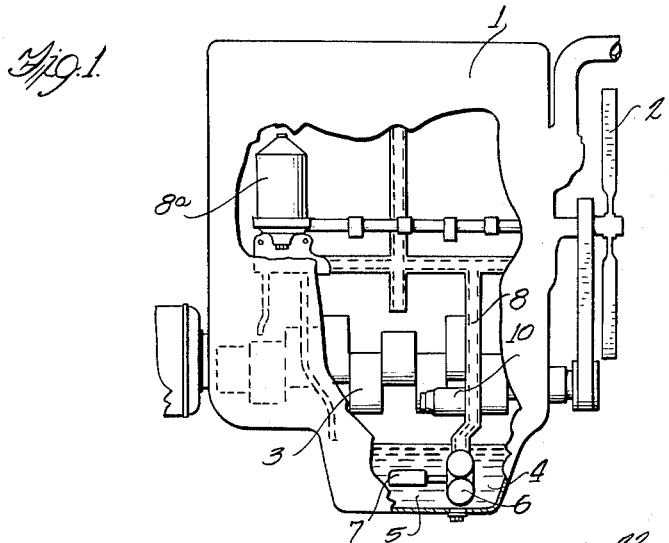
FIG. 1 is a schematic view of the lubrication system of an internal combustion engine employing the novel pressure regulating valve.
Figure 2:
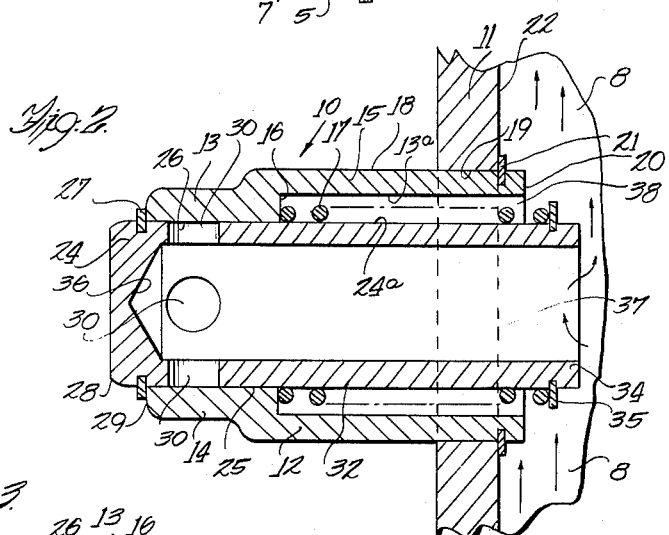
FIG. 2 is an enlarged sectional view of the pressure regulating valve encased within the wall of the lubricating system with the valve in the closed position.

Referring now to the figures and in particular to FIG. 1, there is shown an internal combustion engine 1 having the conventional fan 2, crankshaft 3, an oil lubrication system 4 including an oil reservoir or sump 5, an oil pump 6, pre-filter and pump inlet 7, and an oil conduit system including oil gallery 8 and an oil filter 8a for carrying the oil to the various parts of the engine for their lubrication. It will be appreciated that this is a schematic view and does not show such parts as the engine cylinders or their pistons, etc.

A pressure regulating valve 10 is coupled to the wall 11 of the fluid conduit means or vessel 8 somewhat above the oil sump area 5 and is subjected to the positive oil pressure as developed by the pump 6. The pressure regulating valve 10 comprises a capsule unit 12 which is attached to the wall 11 of conduit 8. The capsule unit 12 has an outer or cylinder member 13 comprising a hollow wall portion 14 of lesser outer dimension and a hollow flange portion 15 of greater dimension than the portion 14. The portion 15 provides an internal shoulder or spring rest 16 between the portions 14 and 15 and houses within the hollow portion 15 a helical spring 17. The outer diametric or peripheral surface 18 of the cylindrical wall portion 15 has a press fit with the inner diametric or peripheral surface of the bore 19 of the wall 11 for snugly holding the inner end portion 20 of the tubular or circular flanged portion 15 of the cylinder or member 13. A retainer element or snap ring 21 optionally integrated with the portion 15 extends above the surface 18 within the conduit system 8 and against the inner wall surface 22 of the wall 11 so as to prevent movement of the member 13 outwardly of the wall 11. It will be noted that this ring or retainer element 21 is of circular form circumscribing the cylinder 13.

An inner member or piston element 24 reciprocates within the tubular member 13 and has its outer diametrical or peripheral surface 25 in sliding sealing engagement with the inner peripheral surface 26 of the outward extending end portion 14 of the tube 13. of the outward extending end portion 14 of the tube 13. A snap ring or retainer element 27 is optionally integral with the outer end portion 28 of the piston element 24 and extends above its outer peripheral surface 25 to impede movement of the piston 24 inwardly into the conduit 8 by engaging the extreme outer end 29 of the portion 14 of the tube 13. A plurality of openings 30 extend through the cylindrical tube or wall 32 of the element 24 proximate the outer end of the capsule valve 10 and are covered by the extension 14 of the cylinder 13.

The inner end 34 of the hollow piston element 24 has optionally integrated about its outer periphery 25 within the conduit 8 a retainer element or circlip member 35 acting as a seat for the spring 17 in conjunction with the shoulder or seat 16 such as to urge the inner valve member or piston 24 inwardly toward the conduit 8, the inward movement of the valve portion 24 being limited by the retainer ring 27.

Figure 3:
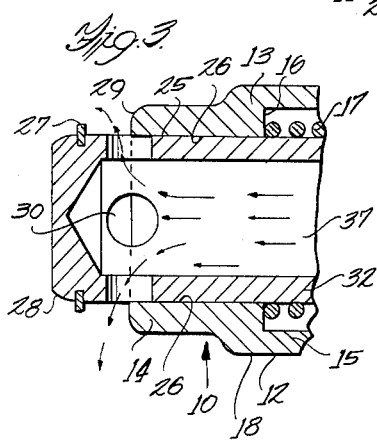
FIG. 3 is a partial view in cross section of the valve in the open position.

As previously mentioned, the pump 6 develops a pressure in the conduit 8 and should the pressure exceed the compressive force of the spring 17 by applying a sufficient load or pressure against the wall 36 of the tubular piston 24 as when fluid is introduced into the chamber 37 of the piston 24, the piston 24 will then be urged outwardly of the fluid conducting system 8 relative to the outer member 13 and uncovering the ports 30 to such an extent to allow a pressure drop within the passageway 8 by spilling the fluid back to the sump area 5 in accordance with the safety pressure characteristics of the spring 17 to the open position of the valve 10, such open position of the valve 10 being illustrated in FIG. 3.

Assembly of the valve 10 within such a fluid pressure system as illustrated by 8 is most easily and readily accomplished by drilling the hole or opening 19 anywhere in the wall 11 of such a system as 8, such that the opening should have an inner diameter equal to or very slightly less than the outer diameter 18 of the valve member 13. The entire valve assembly 10 is inserted in the opening 19 from within the conduit 8 and is forced outwardly with an interference or snug fit to the point at which the retainer ring 21 bottoms against the inner surface of the wall 11. This snug fit will prevent the dislodgement of the member 13. The snap ring 27 and the helical spring 17, which spring holds the snap ring 27 bottomed against the member 13, establish the normal longitudinal position of the piston element 24. The present compact and simple pressure relief valve unit is readily installable anywhere within a fluid pressure system. The only time there is a movement between members 13 and 24 is when there exists a pressure great enough to overcome the force of the compression spring 17.

The shoulder 16, the inner peripheral face portion 13a of the outer member 13, the outer peripheral face portion 24a of the inner element 24 and the snap ring 35 all together define a chamber 38 in which there is disposed the spring 17. The chamber 38 provides a dashpot motion whereby the effect of the inner element 24, upon returning to a closed position blocking ports 30, is dampened or slowed down thus reducing undesirable turbulence of the fluid within conduit 8 and preventing fast closure of the valve 10.

What is claimed is:

1. A capsule type pressure regulating valve for mounting snugly in an opening in a vessel wall containing a fluid under pressure comprising an outer element adapted to be lodged in an opening and having an outer peripheral flange means at one end of the valve for engaging and limiting outward movement of the element relative to a wall, an inner element reciprocal within the outer element and having an outer peripheral external flange means at the other end of the valve engageable with the outer element limiting movement of the inner element inwardly of the outer element, said outer element provided with a seat and said inner element provided with a seat, and resilient means between the seats urging the inner element to a closed position, said inner element having a passage having an aperture adapted for fluid communication with an opening in a vessel and having a port in the side wall of the inner element at said other end of the valve establishing communication between the passage and the outside of the inner element in an open position, the wall of the outer element being slidably engaged by the side wall of the inner element for closing and opening the port in the closed and open positions of the valve.

2. A pressure relief valve for use in regulating the pressure below a predetermined limit in a vessel containing a pressurized fluid and having a wall provided with an aperture, the valve comprising an external element being provided with a hollow portion adapted to be deflectingly wedged in an aperture and a free end adapted to extend outwardly of a vessel, external stop means on the hollow portion at one end of the valve adapted to engage one side of a wall, an internal element disposed in the free end of the external element, each of said elements being in sealing relation with the side wall portion of the other element, said internal element having a passage adapted to communicate with an aperture in a vessel and having an opening in the side wall of the internal element which is slidably engaged with the side wall portion of the free end of the internal element, and which when uncovered thereby establishes communication between the passage and the exeritor of the internal element, a second stop means on the internal element at the other end of the valve adapted to engage the free end of the outer element on the other side of a wall, and biasing means interposed between the elements urging the internal element from a valve open position wherein the port is uncovered by the free end portion to a valve closed position wherein the port is covered by the free end portion, said hollow portion defining with the free end portion a shoulder, and the internal element having a radially outwardly extending removable means in axial alignment with the shoulder and forming therewith and with both elements a dashpot chamber in which is disposed said biasing means, said chamber dampening the closure of the valve.

3. A capsule type pressure relief valve for use in establishing a pressure limit in a vessel containing a pressurized fluid and having a wall provided with an aperture, the capsule valve comprising:

an external element having a hollow first portion adapted to be deflectingly wedged in an aperture and a free end portion adapted to extend in an outer direction from a vessel;

first means projecting from the outside of the hollow portion at an inner end of the valve adapted to engage one side of a wall;

a valve piston of substantially uniform diameter and arranged within the free end portion, and with the wall of the piston in sliding, sealing engagement with the wall of the external element;

a passage in said piston and a radially directed end port in said piston provided therein at an outer end of the valve, said end port being covered by the engaging wall of the external element and adapted to communicate through the passage with an aperture;

said wall of the external element within the hollow portion thereof being relatively relieved between the inner end of the valve and a point which is less than the distance to the covered port of said piston, said point of relief defining a shoulder;

second means projecting from the outside of the piston adjacent the end port in the piston, said second means being engageable with the external element at the outer end of the valve for limiting travel of the piston in a valve closed position;

biasing means in the relieved portion of the wall of the external element abutting said shoulder and connectable for biasing the piston from a valve open position in which the port is exposed at the outer end of the valve to a valve closed position as aforesaid and in which the engaging wall of the external element covers the port in the manner described;

said piston at the inner end of the valve extending beyond the corresponding end of the external element;

and removable means projecting from said extending end of the piston and connecting the biasing means to bias the piston in the described manner, said removable means comprising a snap-ring on the piston which advances therewith from a longitudinally offset position with respect to the external element to a position entirely within the relieved portion of the wall of the external element, and forming with the relieved wall and shoulder a dashpot chamber dampening the valve movement.

4. The invention of claim 3, wherein said first and second projecting means comprise snap rings on the outside surfaces of the respective external element and the piston, and being removably secured thereto at the different ends of the valve as aforesaid.

References Cited by the Examiner

UNITED STATES PATENTS

| | | | |
|---|---|---|---|
| 2,197,271 | 4/40 | Kerrick | 137—540 |
| 2,319,021 | 5/43 | Van Nest | 137—494 |
| 2,928,417 | 3/60 | Buckner et al. | 137—538 |

FOREIGN PATENTS

| | | |
|---|---|---|
| 1,078,663 | 5/54 | France. |

ISADOR WEIL, *Primary Examiner.*

WILLIAM F. O'DEA, MARTIN P. SCHWADRON,
*Examiners.*